United States Patent
Messick et al.

(10) Patent No.: US 7,069,245 B2
(45) Date of Patent: Jun. 27, 2006

(54) SIMULTANEOUS NETWORK NEWS DISTRIBUTION

(75) Inventors: Steve Messick, Pleasanton, CA (US); Bill Ross, San Francisco, CA (US); Dean Large, San Francisco, CA (US); Jeremy Brooks, El Cerrito, CA (US)

(73) Assignee: Business Wire, San Francisco, CA (US)

( * ) Notice: Subject to any disclaimer, the term of this patent is extended or adjusted under 35 U.S.C. 154(b) by 90 days.

(21) Appl. No.: 10/359,992

(22) Filed: Feb. 6, 2003

(65) Prior Publication Data

US 2004/0158533 A1    Aug. 12, 2004

(51) Int. Cl.
G06F 17/60 (2006.01)

(52) U.S. Cl. .............. 705/57; 705/1; 713/187; 709/203; 709/217; 709/219

(58) Field of Classification Search ............. 705/1, 705/57, 51; 707/10; 370/13; 713/189; 709/203, 709/217, 219
See application file for complete search history.

(56) References Cited

U.S. PATENT DOCUMENTS

| | | | | |
|---|---|---|---|---|
| 5,307,340 A | * | 4/1994 | Inoue et al. ............... 370/245 |
| 5,724,425 A | | 3/1998 | Chang et al. ............... 380/25 |
| 5,960,086 A | | 9/1999 | Atalla ....................... 380/44 |
| 6,189,008 B1 | | 2/2001 | Easty et al. ............... 707/10 |
| 6,289,350 B1 | | 9/2001 | Shapiro et al. ............ 707/100 |
| 6,341,212 B1 | | 1/2002 | Shende et al. ............. 434/350 |
| 6,363,390 B1 | | 3/2002 | Shapiro et al. ............ 707/100 |
| 6,370,535 B1 | | 4/2002 | Shapiro et al. ............ 707/100 |
| 6,442,549 B1 | * | 8/2002 | Schneider .................. 707/10 |
| 6,584,199 B1 | * | 6/2003 | Kim et al. ................. 380/203 |
| 6,763,370 B1 | * | 7/2004 | Schmeidler et al. ....... 709/203 |
| 2002/0002674 A1 | * | 1/2002 | Grimes et al. ............. 713/156 |
| 2002/0049717 A1 | | 4/2002 | Routtenberg et al. ....... 707/1 |
| 2002/0051539 A1 | | 5/2002 | Okimoto et al. ........... 380/211 |
| 2002/0052877 A1 | | 5/2002 | Okamoto et al. .......... 707/100 |

FOREIGN PATENT DOCUMENTS

JP    2002259693    *  9/2002

OTHER PUBLICATIONS http://www.faqs.org/rfc/pdf/rfc1004.txt.pdf D.L. Mills Apr. 1987.*

Schneier, B. "Applied Cryptography: Protocols, Algorithms, and Source Code in C," Wiley, Second Edition, Oct. 18, 1995, ISBN: 0471117099, 4 pages.

* cited by examiner

Primary Examiner—James P. Trammell
Assistant Examiner—John M. Winter
(74) Attorney, Agent, or Firm—Haverstock & Owens LLP

(57) ABSTRACT

The present invention is a method, system and article of manufacture that provides near simultaneous delivery of information over a packet routed network architecture in an inexpensive, fast, global, bi-directional communication medium, while having means to verify receipt of a transmission. The present invention utilizes a local mainframe distributing encrypted client submissions over a network such as the internet to a number of customers having a receiver. The present invention includes delivering a relatively small decryption key over the same network so that a customer is able to decrypt the previously received encrypted client submission and display the decrypted version simultaneously relative to the other customers.

35 Claims, 4 Drawing Sheets

SIMULTANEOUS NETWORK NEWS DISTRIBUTION

FIELD OF THE INVENTION

The present invention relates generally to a method and apparatus for a news distribution service. More specifically, the present invention relates to a method and apparatus for simultaneously distributing news over a network.

BACKGROUND OF THE INVENTION

News media organizations adopted satellite broadcast technology to disseminate news worldwide to their readers. Satellite technology fit all the needs of a news broadcast system. This technology was fast, reliable, and insured that the receiving public all saw the information at relatively the same time. Competition set in and news organizations started competing for the broadcast readership dollars. The faster and better geographic coverage of the broadcast network, the more readers could receive information, be it news, sports or entertainment programs, the more revenue could be generated for the news organization.

The business community adopted this medium. By the mid-1970s, the PR wire services were using satellites to build full domestic networks in the United States that could send corporate information quickly to media all over the country. As the PR wire services became the accepted and trusted information disseminator for corporations, the wire services took on the additional role as the official provider of "disclosure" for public corporations.

The Security and Exchange Commission (SEC) now requires publicly traded corporations to disclose key information periodically about any corporation to the public in a fair and simultaneous manner. Examples of this type of information are quarterly earnings statistics, product announcements and management changes. Simultaneous disclosure provides that all users of corporate information such as investment firms and news agencies all have equal and simultaneous access to corporate information. This insures that no one organization would have an advantage over another in using the information for any purpose.

Demand for corporate information continues to grow as news and investment firms compete for the public's dollar. Therefore, the role of the PR news wire is expanding to provide fast, electronic, and simultaneous delivery of required disclosures and general press release information. Satellite technology was the key method for broadcasting the news to the various media, investment, and research communities.

FIG. 1 depicts a Satellite Information Distribution System 100 currently used in the industry. In this system, a Local Mainframe 106 receives Client Submissions 102 through an Order Entry 104 application and then distributes a news release over Distribution Lines 112 to Satellite Uplinks 116 throughout the distribution network. Such Satellite Uplinks 116 then transmit the news release to a Satellite 118. The Satellite 118 transmits the news release down to the various customer Media Receiver Nodes 120, where the customers will transfer this information to a Media Editorial System 124 before releasing the news release to the public.

Satellite broadcast is a functional technology for simultaneous news distribution. However, there are problems with this technology that the industry has been forced to live with. Satellite transmissions are one way broadcasts. Thus, even where simultaneous disclosure is required, there is no means to know that the transmission was successful. It is too expensive to put a transmitter at a news media receiver, and therefore, wire service transmissions are sent out "blind," having no verification message coming back from the media point to validate receipt of the news release. Referring back to FIG. 1, the Satellite Information Distribution System 100 does utilize a Monitor 126. This Monitor 126 is connected to the Satellite Uplinks 116 so that every Client Submission 102 distributed through the Satellite Uplinks 116 is also sent to the Monitor 126. While utilizing a Monitor 126 in this fashion is an effective way to verify the operation of the Satellite Uplink 116, the Monitor 126 is unable to verify that any of the client Submissions 102 reach the customer Media Receiver Nodes 120. Therefore, this architecture provides no acceptable method of verifying receipt of the Client Submissions 102 by the Media Receiver Nodes 120. Land based communications networks are readily available which provide for two-way communications. However, these land based networks are far too expensive to set up and maintain to make it a cost effective choice for broadcast technology.

Introduction of the public Internet in the mid-1990's provided a new communications medium for the dissemination of news to the media community. As the Internet matured in the late 1990's, certain advantages over satellite technology started to become apparent. Internet technology is faster, cheaper, global not regional, and is a bi-directional communications medium.

However, the Internet has one major flaw that prohibits itself from being accepted as a viable network for financial disclosure. The Internet's multi-point packet forwarded architecture can not insure that information would reach multiple destinations in a fair and simultaneous fashion.

What is needed is the ability to provide near simultaneous delivery of information over a packet routed network architecture.

What is also needed is the ability to provide near simultaneous delivery of information in an inexpensive, fast, global, bi-directional communication medium having means to verify receipt of a transmission.

SUMMARY OF THE INVENTION

The present invention is a method, system and article of manufacture that provides simultaneous or near simultaneous delivery of information over a packet routed network architecture in an inexpensive, fast, global, bi-directional communication medium, while also having means to verify receipt of a transmission. The present invention utilizes a local mainframe distributing encrypted client submissions over a network such as the internet to a number of customers having a receiver. The present invention includes delivering a relatively small decryption key over the same network so that a customer is able to decrypt the previously received encrypted client submission and display the decrypted version simultaneously relative to the other customers.

An embodiment of the present invention includes a method of providing simultaneous information delivery over a network comprising the steps of encrypting a set of data wherein the set of data includes information for simultaneous delivery, distributing the encrypted set of data to a plurality of receivers over the network, verifying that each of the plurality of receivers received the encrypted set of data, wherein the step of verifying includes receiving a confirmation receipt from each of the plurality of receivers, delivering a key to each of the plurality of receivers over the network and decrypting the set of data with the key.

The method of the present invention also includes troubleshooting the network, wherein when in the verifying step, the confirmation receipt is not received from one of the plurality of receivers, redistributing the encrypted set of data when the troubleshooting step indicates that one of the plurality of receivers did not receive the encrypted set of data, wherein the encrypted set of data is redistributed to those receivers that did not receive the encrypted set of data, waiting to receive the receipt confirmation from each of the plurality of receivers before starting the delivering step.

The method of the present invention further includes the step of delivering such that the key is delivered to each of the plurality of receivers at substantially the same time, the key is substantially smaller in size than the encrypted set of data and such that the key is able to travel over the network to each of the plurality of receivers in substantially the same amount of time. In the method of the present invention, the network is the world wide web, set of data is a news release, the confirmation receipt is an encrypted status message, the key is a set of decryption code and the plurality of receivers include a display for viewing the set of data and overall system operational status information.

A further embodiment of the present invention is a system for providing simultaneous information delivery over a network, comprising means for encrypting a set of data wherein the set of data includes information for simultaneous delivery, means for distributing the encrypted set of data to a plurality of receivers over the network, means for verifying that each of the plurality of receivers received the encrypted set of data, wherein the means for verifying includes receiving a confirmation receipt from each of the plurality of receivers, means for delivering a key to each of the plurality of receivers over the network and means for decrypting the set of data with the key.

The system of the present invention also includes means for troubleshooting the network, wherein when the means for verifying do not receive the confirmation receipt from one of the plurality of receivers, means for redistributing the encrypted set of data when the means for troubleshooting step indicates that one of the plurality of receivers did not receive the encrypted set of data, wherein the encrypted set of data is redistributed to those receivers that did not receive the encrypted set of data and the means for delivering does not deliver the key until the means for verifying receives the receipt confirmation from each of the plurality of receivers.

The system of the present invention further includes delivering the key to each of the plurality of receivers at substantially the same time. The key is substantially smaller in size than the encrypted set of data, such that the key is able to travel over the network to each of the plurality of receivers in substantially the same amount of time. In the system of the present invention, the network is the world wide web, the set of data is a news release, the confirmation receipt is an encrypted status message, the key is a set of decryption code and the plurality of receivers include a display for viewing the set of data and overall system operational status information.

A further embodiment of the present invention is an article of manufacture comprising a computer readable medium bearing program code embodied therein for use with a computer. The article of manufacture can be any conventional media for storing computer programs including but not limited to a CD Rom, a floppy, flippy or zip disc or a pre-programmed flash memory card. The computer program code including, means for encrypting a set of data wherein the set of data includes information for simultaneous delivery. Also included is a means for distributing the encrypted set of data to a plurality of receivers over a network, and means for verifying that each of the plurality of receivers received the encrypted set of data, wherein the means for verifying includes receiving a confirmation receipt from each of the plurality of receivers. The code also provides means for delivering a key to each of the plurality of receivers over the network and means for decrypting the set of data with the key.

The article of manufacture of the present invention also includes means for troubleshooting the network, wherein when the means for verifying do not receive the confirmation receipt from one of the plurality of receivers, means for redistributing the encrypted set of data when the means for troubleshooting step indicates that one of the plurality of receivers did not receive the encrypted set of data, wherein the encrypted set of data is redistributed to those receivers that did not receive the encrypted set of data and the means for delivering does not deliver the key until the means for verifying receives the receipt confirmation from each of the plurality of receivers.

The article of manufacture of the present invention further includes the means for delivering is such that the key is delivered to each of the plurality of receivers at substantially the same time, the key is substantially smaller in size than the encrypted set of data, such that the key is able to travel over the network to each of the plurality of receivers in substantially the same amount of time. For use with the article of manufacture of the present invention, the network is the world wide web, the set of data is a news release, the confirmation receipt is an encrypted status message, the key is a set of decryption code and the plurality of receivers include a display for viewing the set of data and overall system operational status information.

A further embodiment of the present invention is a system comprising a computer readable medium bearing program code embodied therein for use with a computer, the computer program code including a local mainframe, a network, wherein the network is coupled with the local mainframe, a plurality of receivers coupled with the network, the plurality of receivers configured to receive a set of encrypted data from the local mainframe and a terminal coupled to each of the plurality of receivers such that a decrypted set of data is displayed on the terminal, wherein a key, the key configured to convert the encrypted set of data to the decrypted set of day, is simultaneously received by each of the plurality of receivers.

The system of the present invention also includes the local mainframe is configured in a three tier architecture including an application server, a front server and a database, the application server is configured to receive a client submission from an order entry application and further configured to access the database, the decrypted set of data is substantially similar to the client submission, the client submission is processed by the order entry application, and the front server is coupled to the application server and is further coupled to the network to effectuate distribution of the set of encrypted data to the plurality of receivers. In the system of the present invention, the network can be a local area network, a wide area network or the world wide web. The plurality of receivers can include a decryption database configured such that the decryption database effectuates the key converting the encrypted set of data to the decrypted set of data.

A further embodiment of the present invention includes an apparatus for providing simultaneous information delivery over a network comprising a storage media for storing a computer application, a processing unit coupled to the storage media and a user interface coupled to the processing unit such that a plurality of users can receive an encrypted set of data and have the encrypted set of data decrypted with a simultaneously delivered key.

DETAILED DESCRIPTION OF THE PREFERRED EMBODIMENT

There are several different systems on the market that facilitate the broadcast of information over the Internet. However, no systems are able to provide near simultaneous verifiable transmission over a packet routed network architecture. The present invention has the ability to send the same information from one originator to many recipients in a fashion wherein all recipients receive the information at relatively the same time.

The present invention is a system and method that facilitates the simultaneous broadcast of news releases using the public Internet communications network. As stated earlier, there are many technology vendors that have information broadcast products for the Internet. However, none of these vendors have the ability to ensure that the broadcast information is broadcasted in a simultaneous or near simultaneous manner. It will be apparent in the detailed description below that the present application may have numerous applications outside the realm of news distribution. In fact, the present invention may be utilized to distribution any type of information over a network in a simultaneous manner.

Figure 1:
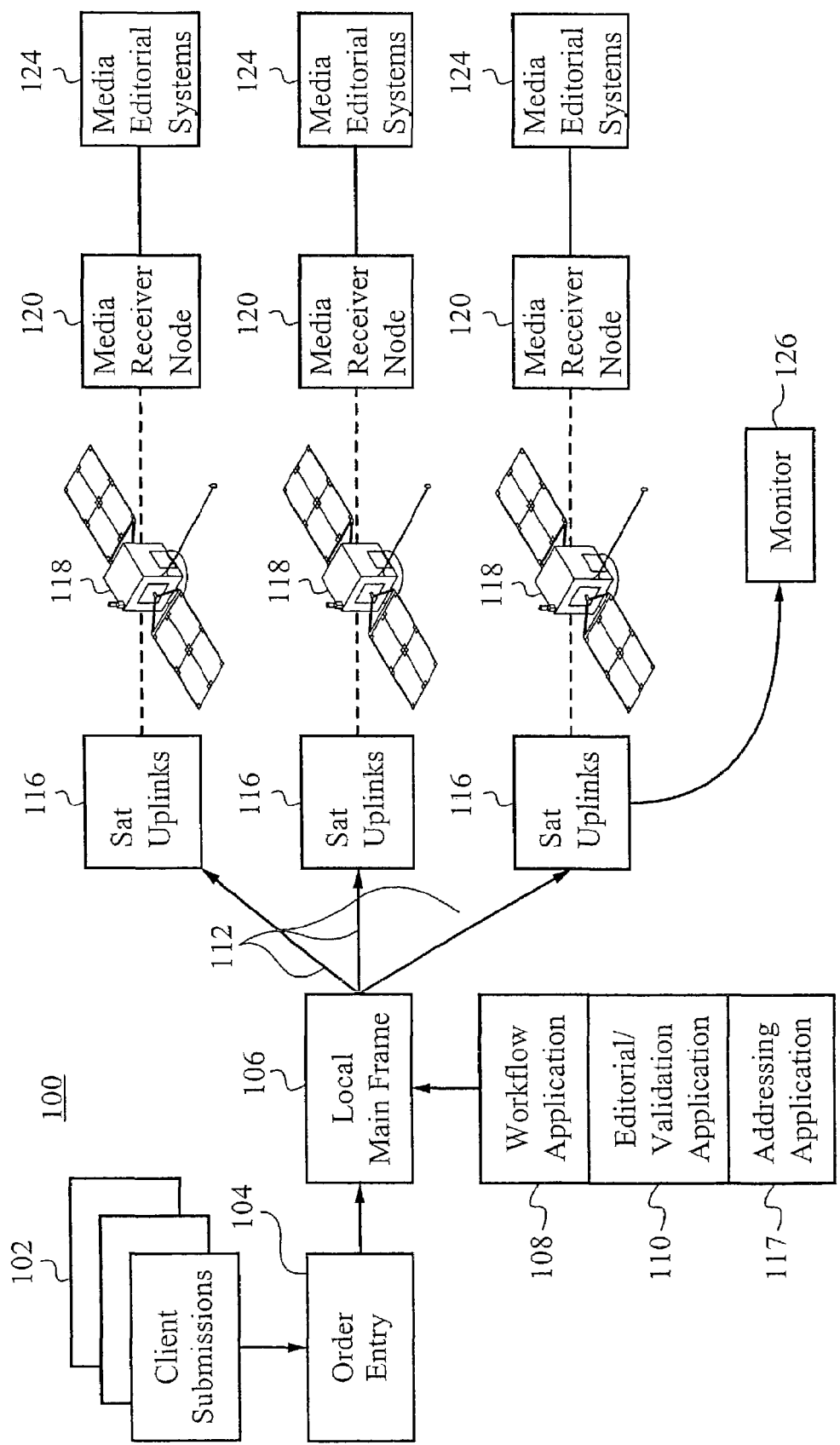
FIG. 1 illustrates a system architecture of the prior art.
Figure 2:
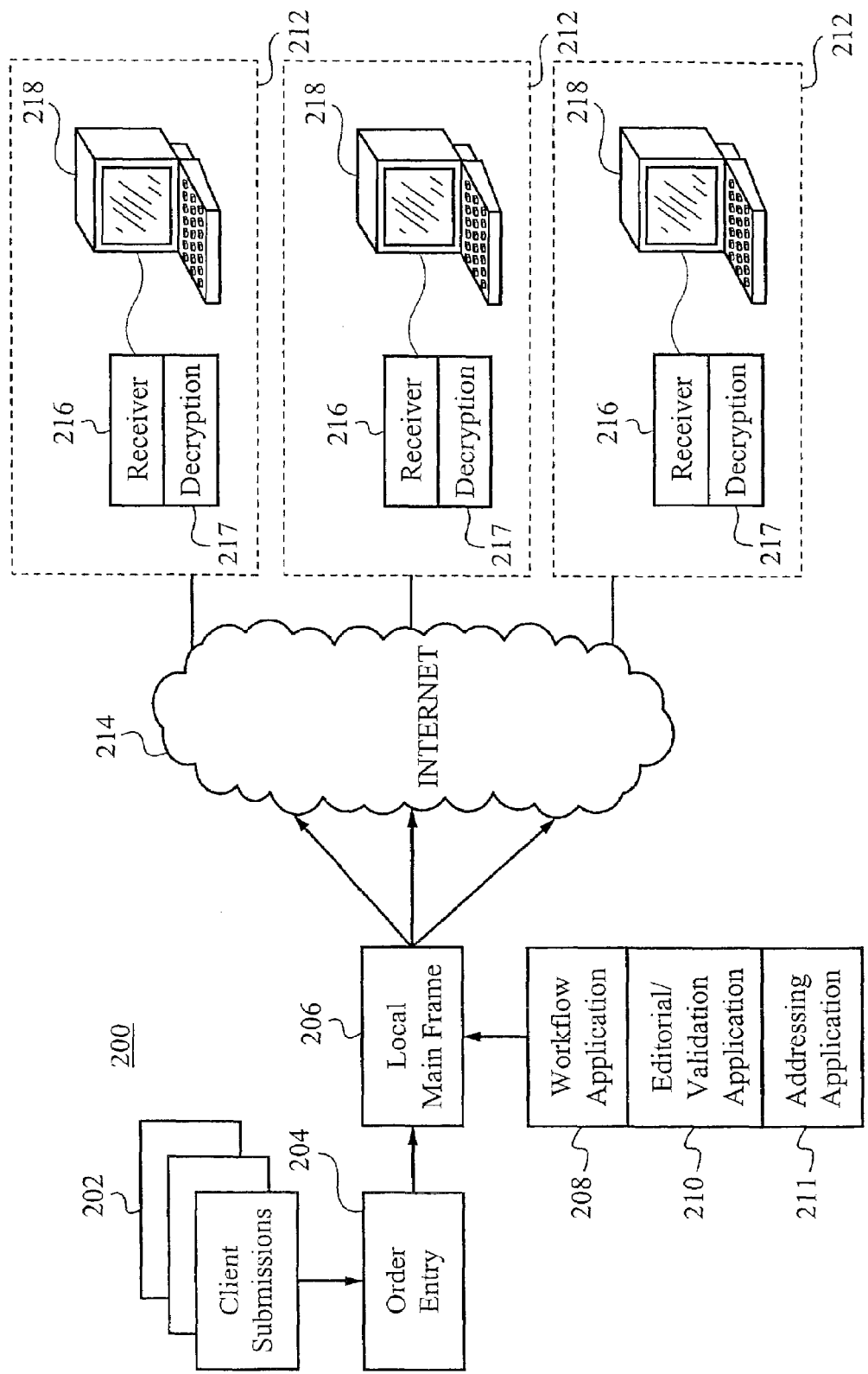
FIG. 2 illustrates a system architecture of an embodiment of the present invention.

FIG. 2 depicts an embodiment of the present invention. The Distribution System 200 of the present invention simultaneously or nearly simultaneously delivers a set of data to a number of customers, each having a Receiver 216 and a Display 218. Client Submissions 202 are received by an Order Entry 204 application. The Client Submissions 202 can be, but are not limited to, submissions made online through an internet web site, over email or even through fax transmissions. The Client Submissions 202, after being formatted in the Order Entry 204 application, are transferred to the Local Mainframe 206. The Local Mainframe 206 can be a mainframe computer, personal computer, work station or special purpose digital machine.

Still referring to FIG. 2, as the Client Submissions 202 enter the Local Mainframe 206, a Workflow Application 208 prioritizes the Client Submissions 202 for transfer to customers. Additionally, an Editorial/Validation Application 210 as well as an Addressing Application 211 also processes each Client Submission 202 before the Client Submission 202 is transferred to customers. The Editorial/Validation Application 210 verifies the Client Submission 202, and makes any revisions or changes necessary to comply with SEC regulations and guidelines regarding such submissions. After making any necessary revisions, the Editorial/Validation Application 210 encrypts the Client Submission 202. The Addressing Application 211 determines which customers are to receive the Client Submission 202, and addresses the Client Submission 202 accordingly for distribution. It should be noted that while at times, the process of distributing Client Submissions 202 is described herein as occurring individually, the present invention is capable of processing and distributing a number of Client Submissions 202 simultaneously. Therefore, descriptions of a single Client Submission 202 should not the limit the present invention to processing and distributing a single Client Submission 202. For purposes of this disclosure, an application is a software program written to operate on a computer. Alternatively, an application could be a special purpose apparatus, such as a finite state machine built to implement the function of the application.

After a single Client Submission 202 enters the Local Mainframe 206 and the Workflow, Editorial/Validation and Addressing Applications (208, 210 & 214, respectively) have completed prioritizing, processing and encrypting the Client Submission 202, the encrypted Client Submission 202 is distributed to the customers through a Network 214. In the present embodiment, the Network 214 is the Internet. However, such a network can also be embodied as a local area network (LAN), a wide area network (WAN) or any other Network 214 able to transfer information. Each Customer 212 has a Receiver 216 that, after receiving an encrypted Client Submission 202, stores the encrypted Client Submission 202 in a Decryption Storage 217. The Receivers 216, upon receiving the Client Submission 202, will send a verification message back to the Local Mainframe 206 through the Network 214. Because the encrypted Client Submission 202 may be of relatively large size, it is not expected, nor important for the encrypted Client Submission 202 to reach the Receivers 216 simultaneously. However, it is possible that the Client Submission 202 may reach the Receivers 216 simultaneously.

Still referring to FIG. 2, after receiving the receipt confirmation for any given Client Submission 202 from each of the intended Receivers 216, the Local Mainframe 206 will send a decryption key to each Receiver 216 through the Network 214. The decryption key will be sent by the Local Mainframe 206 at the time desired for simultaneous release of the data contained in the encrypted Client Submission 202. Because the key is small relative to the size of the Client Submission 202, the key's travel time from the Local Mainframe 206, through the Network 214, to all the Receivers 216, is exactly or nearly equal, thereby effectuating simultaneous delivery. Once the key has reached the Receivers 216, each individual Customer 212 can decrypt the Client Submission 202 in the Decryption Storage 217, and further view the Client Submission 202 on a Display 218. The Display 218 will also be capable of displaying overall system operational status provided by the Local Mainframe 206.

Similarly, Client Submissions 202 are pre-delivered to all Customers 212 prior to a specified broadcast release time. The Client Submissions 202 to be broadcast are encrypted prior to being delivered to each Receiver 216. When all selected Receivers 216 have acknowledged receipt of the content item by sending an encrypted status message, preferably to the Local Mainframe 206, a small packet containing the decryption key is then sent to each Receiver 216. This key unlocks the encrypted Client Submission 202 and the information is then available to the Receiver 216 in readable/viewable form on a Display 218. If the Receiver 216 can not receive the Client Submissions 202 or the decryption key, or even send an encrypted status message, the Receiver 216 will automatically dial-up and try to re-establish a connection to continue receipt of Client Submissions 202, encrypted keys and to send encrypted status messages. The encrypted status messages will include warning that the Receiver 216 is in dial-up mode and additional confirmation of Client Submissions 202 and decryption keys that were received before the disconnection occurred.

Still referring to the preferred embodiment as depicted in FIG. 2, near simultaneous delivery is achieved by the fact that the key, which is sent to each and every Receiver 216, is a very small data packet, ideally 24 bytes in size. Due to its small size, the key can be transmitted to many Receivers 216 world wide via the Network 214 in a few seconds. Therefore, insuring that a simultaneous or near simultaneous broadcast, in a preferred embodiment a broadcast window of a few seconds, can be obtained. In a United States based System 200, an encrypted Client Submission 202 content can be broadcast to hundreds of domestic Receivers 216 in a few milliseconds, and to thousands of domestic Receivers 216 in less than 10 seconds, usually 1–5 seconds. These times are acceptable overall delays in meeting simultaneous financial news disclosure. In fact, these times constitute a simultaneous delivery in the realm of financial news disclosure.

Figure 3:
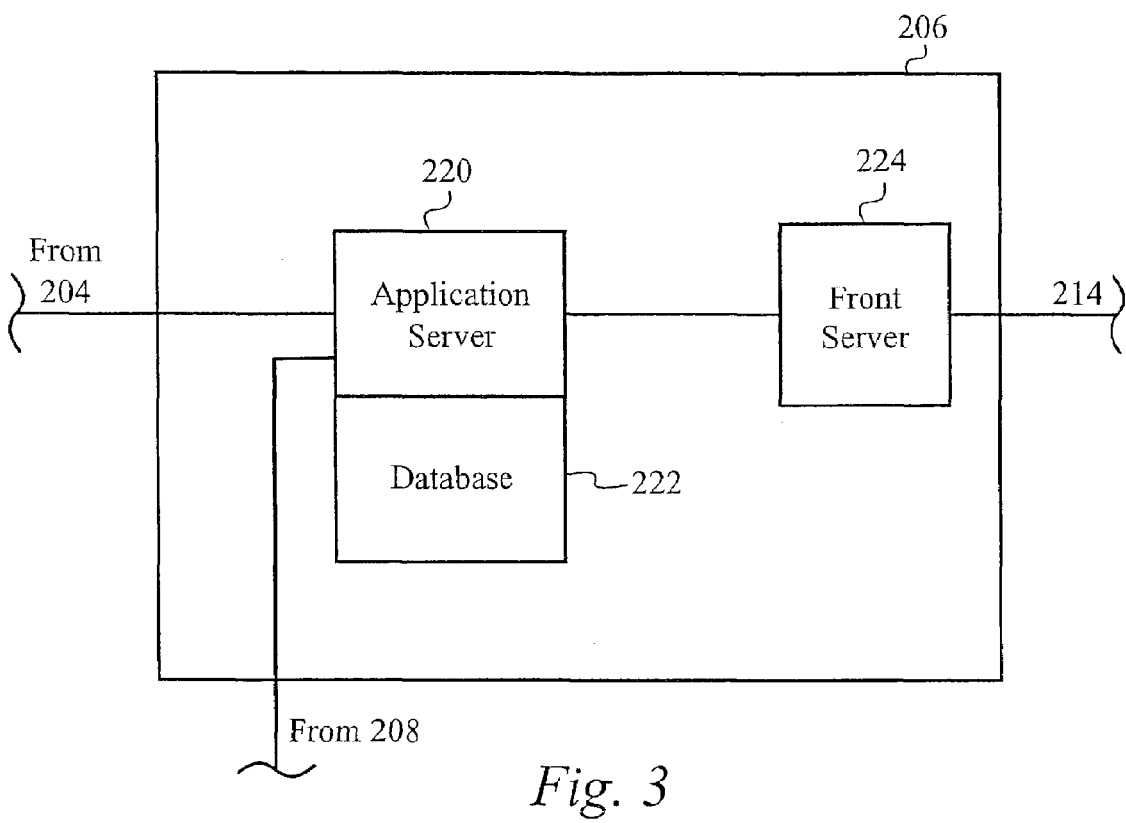
FIG. 3 illustrates a block diagram of a local mainframe of an embodiment of the present invention.

FIG. 3 depicts a Local Mainframe 206 of the preferred embodiment of the present invention. Client Submissions 202 are received in the Local Mainframe 206 from the Order Entry 204 application by the Application Server 220. The Application Server 220 accesses a Database 222, the Database 222 containing Receiver 216 information, before sending the Client Submission 202 to the Front Server 224. The Front Server 224 provides the means for connecting the Local Mainframe 206 to the Network 214, and further the Front Server 224 distributes the Client Submissions 202 to the Receivers 216, through the Network 214. Additionally, the Workflow Application 218, as well as the Editorial/Validation Application 210 and the Addressing Application 211 are coupled to the Application Server 220.

Still referring to FIG. 3, the present invention includes sub-systems as described above developed to preferably run on industry standard computing hardware. FIG. 3 depicts the widely accepted "three-tier" Internet model. The Application Server 220 provides communication to the Database 222, preferably an Oracle database, that houses content, receiver addresses, receiver demographics, security information and content release times. The second tier webserver, labeled here as the Front Server 224 handles the direct communications to each Receiver 216 through the Network 214. As stated previously, the plurality of Receivers 216 reside at various media organizations' locations requiring the Front Server 224 to communicate through the Network 214. The Receivers 216 handle the proprietary Network 214 communications between the Front Server 224 and the Customers 212, and management of the encrypted and exposed presentable content to the Customers 212 in the Decryption Storage 217.

In a preferred embodiment, the System 200 (FIG. 2) utilizes industry standards for the Client Submission 202 packet envelope, and content encryption (TCP/IP, and RSA 128 bit), and the Applications (208, 210, 211) and Servers (220, 224) are developed to operate on a UNIX based platform. The preferred Receivers 216 use the Linux operating system running on an Intel platform. Of course, alternative Client Submission 202 packet envelope and content encryption can be utilized in further embodiments. Likewise, alternative operating platforms and Receiver 216 operating systems may be utilized in further embodiments.

Also in a preferred embodiment, the connection between the Receivers 216 and the Network 214 as well as the Front Server 224 and the Network 214 use a TCP/IP socket and the Client Submission 202 is encrypted with a 128-bit Rijndael symmetric key, which is exchanged using a 2048-bit RSA key. The time-keys are also 128-bit Rijndael keys. The aforementioned specific details of the preferred embodiment of the present invention should not limit further embodiments.

Referring again to FIG. 3, in a preferred embodiment, the Application Server 220 and Front Server 224 operate on the UNIX platform. The Receiver 216 is a network appliance-style PC running a minimal Linux distribution, wherein the packages necessary to operate the System 200 are installed. Preferably TCP wrappers limit the domains the Receiver 216 can connect with to Local Mainframe 206 and a media site. The ports of the Receiver 216 are further limited to those strictly necessary, such as a web server, accessible only from the media site domain, an applet server to augment the web server, wherein serialized java objects can be sent across a connection. These web/applet servers allow the media site to watch Client Submissions 202 arriving and provide limited control features. The ports of the Receiver 216 can optionally include an FTP server, accessible only from the media site domain. The media site can use this to get news for their own processing. The ports of the Receiver 216 can also optionally include an SSH server, accessible only from the Local Mainframe 206.

This allows the Local Mainframe 206 to fix problems remotely. All unnecessary services available to the Receiver 216 such as mail, finger, time, daytime, echo, etc., are disabled in a preferred embodiment. As stated previously, if the Network 214 connection is disrupted, the Receiver 216 automatically dials directly into the Local Mainframe 206 until regular network service is restored. The above specification referring to a preferred embodiment and preferable components, operating platforms or protocols should not limit the implementation of the present invention using alternative components, operating platforms or protocols.

Figure 4:
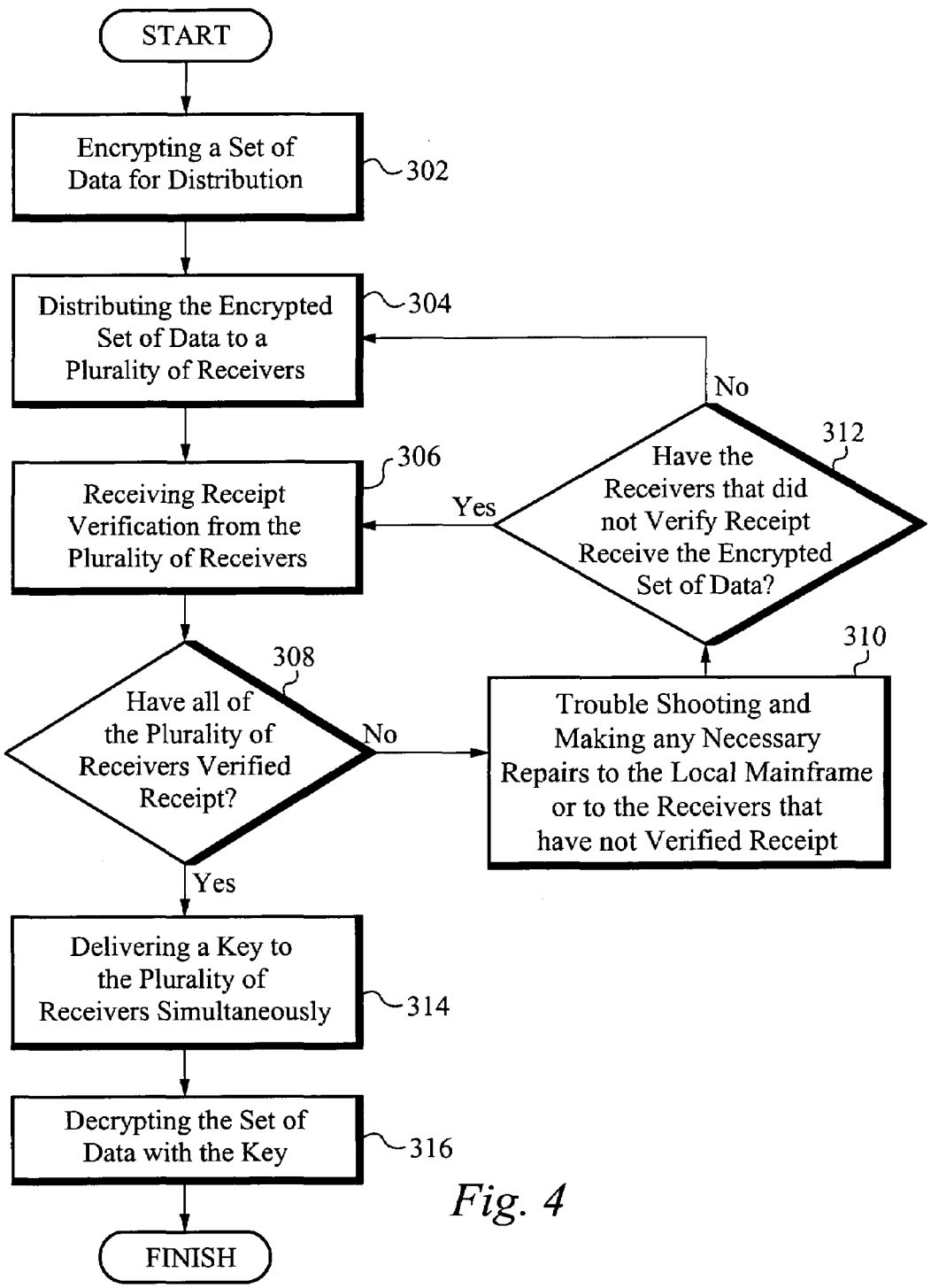
FIG. 4 illustrates a flow chart representation of an embodiment of the present invention.

A method of the present invention is depicted in FIG. 4. In the step 302, a set of data is encrypted for distribution through a network by a local mainframe. The data encrypted in the step 302 is prepared for simultaneous delivery to a plurality of customers. In the step 304, the encrypted data is distributed over a network to a plurality of receivers, wherein the network is configured such that the encrypted data may or may not reach each of the plurality of receivers simultaneously. In the step 306, the plurality of receivers send a receipt verification back to the local mainframe upon receipt of the encrypted data. In the step 308, it is determined whether all of the intended receivers have sent a receipt confirmation back to the local mainframe within a predetermined delay. If the answer to step 308 is "NO", then the local mainframe troubleshoots and makes any unnecessary repairs to the local mainframe or the receivers in the step 310.

After the troubleshooting step 310, it is again determined whether the receivers that did not initially receive the encrypted, have now received this data due to the troubleshooting and repairing step in the step 312. If the answer to the step 312 inquiry is "NO", then the encrypted set of data is redistributed by the local mainframe to the receivers in the step 304. However, if the answer to the inquiry in the step 312 is "YES", then the receivers will send a receipt verification back to the local mainframe in the step 306.

Referring now back to the step 308, if the local mainframe has received a receipt verification from all of the plurality of receivers, the local mainframe will then deliver a key to the plurality of receivers at a predetermined time in the step 314. The key will be relatively small in size and therefore able to be delivered in a simultaneous fashion at the predetermined time to all of the plurality of receivers in the step 314. After simultaneously delivery of the key in the step 314, the plurality of receivers will then be able to decrypt the previously delivered encrypted set of data with the key in the step 316.

Referring back to FIG. 2, the article of manufacture can be any conventional media for storing a computer program to implement the system and method described in the above description. In the present invention, conventional storage media may include CD Rom, floppy, flippy or zip disk, or a pre-programmed flash memory card. In an embodiment of the present invention, such a conventional storage media bearing computer program code will be located in the Local Mainframe 206 as well as in each of the plurality of Receivers 216 to facilitate the system and method as described above.

The present invention has been described in terms of specific embodiments incorporating details to facilitate the understanding of the principles of construction and operation of the invention. Such reference herein to specific embodiments and details thereof is not intended to limit the scope of the claims appended hereto. For example, the present invention may be utilized to transfer information other than news in a number of different industries in a simultaneous manner. It will be apparent to those skilled in the art that modifications can be made in the embodiment chosen for illustration without departing from the spirit and scope of the invention.

What is claimed is:

1. A method of providing simultaneous information delivery over a network, comprising the steps in the order listed of:
   a. encrypting a set of data wherein the set of data includes information for simultaneous delivery;
   b. distributing the encrypted set of data to a plurality of receivers over the network;
   c. verifying that each of the plurality of receivers received the encrypted set of data, wherein the step of verifying includes receiving a confirmation receipt from each of the plurality of receivers;
   d. waiting a predetermined delay to receive the confirmation receipt from each of the plurality of receivers before starting a delivering step;
   e. delivering a key to each of the plurality of receivers over the network after all the plurality of receivers confirms receipt;
   f. decrypting the encrypted set of data with the key at each of the plurality of receivers;
   g. troubleshooting the network, in the event that the confirmation receipt is not received from one of the plurality of receivers; and
   h. redistributing the encrypted set of data when the troubleshooting step indicates that one of the plurality of receivers did not receive the encrypted set of data, wherein the encrypted set of data is redistributed to those receivers that did not receive the encrypted set of data.

2. The method as claimed in claim 1, wherein the step of delivering is such that the key is delivered to each of the plurality of receivers at substantially the same time.

3. The method as claimed in claim 1, wherein the key is substantially smaller in size than the encrypted set of data, such that the key is able to travel over the network to each of the plurality of receivers in substantially the same amount of time.

4. The method as claimed in claim 1, wherein the network is the world wide web.

5. The method as claimed in claim 1, wherein the set of data is a news release.

6. The method as claimed in claim 1, wherein the confirmation receipt is an encrypted status message.

7. The method as claimed in claim 1, wherein the key is a set of decryption code.

8. The method as claimed in claim 1, wherein the plurality of receivers include a display for viewing the set of data.

9. A system for providing simultaneous information delivery over a network, comprising:
   a. means for encrypting a set of data wherein the set of data includes information for simultaneous delivery;
   b. means for distributing the encrypted set of data to a plurality of receivers over the network;
   c. means for verifying that each of the plurality of receivers received the encrypted set of data, wherein the means for verifying includes receiving a confirmation receipt from each of the plurality of receivers;
   d. means for waiting a predetermined delay to receive the confirmation receipt from each of the plurality of receivers;
   e. means for delivering a key to each of the plurality of receivers over the network after all the plurality of receivers confirms receipt;
   f. means for decrypting the encrypted set of data with the key at each of the plurality of receivers;
   g. means for troubleshooting the network when the means for verifying do not receive the confirmation receipt from one of the plurality of receivers; and
   h. means for redistributing the encrypted set of data when the means for troubleshooting indicates that one of the plurality of receivers did not receive the encrypted set of data, wherein the encrypted set of data is redistributed to those receivers that did not receive the encrypted set of data.

10. The system as claimed in claim 9, wherein the means for delivering is such that the key is delivered to each of the plurality of receivers at substantially the same time.

11. The system as claimed in claim 9, wherein the key is substantially smaller in size than the encrypted set of data, such that the key is able to travel over the network to each of the plurality of receivers in substantially the same amount of time.

12. The system as claimed in claim 9, wherein the network is the world wide web.

13. The system as claimed in claim 9, wherein the set of data is a news release.

14. The system as claimed in claim 9, wherein the confirmation receipt is an encrypted status message.

15. The system as claimed in claim 9, wherein the key is a set of decryption code.

16. The system as claimed in claim 9, wherein the plurality of receivers include a display for viewing the set of data.

17. An article of manufacture comprising a computer readable medium bearing program code embodied therein for use with a computer, the computer program code including:
   a. means for encrypting a set of data wherein the set of data includes information for simultaneous delivery;
   b. means for distributing the encrypted set of data to a plurality of receivers over a network;
   c. means for verifying that each of the plurality of receivers received the encrypted set of data, wherein the means for verifying includes receiving a confirmation receipt from each of the plurality of receivers;

d. means for waiting a predetermined delay to receive the confirmation receipt from each of the plurality of receivers;

e. means for delivering a key to each of the plurality of receivers over the network after all the plurality of receivers confirms receipt;

f. means for decrypting the encrypted set of data with the key at each of the plurality of receivers;

g. means for troubleshooting the network when the means for verifying do not receive the confirmation receipt from one of the plurality of receivers; and h. means for redistributing the encrypted set of data when the means for troubleshooting indicates that one of the plurality of receivers did not receive the encrypted set of data, wherein the encrypted set of data is redistributed to those receivers that did not receive the encrypted set of data.

18. The article of manufacture as claimed in claim 17, wherein the means for delivering is such that the key is delivered to each of the plurality of receivers at substantially the same time.

19. The article of manufacture as claimed in claim 17, wherein the key is substantially smaller in size than the encrypted set of data, such that the key is able to travel over the network to each of the plurality of receivers in substantially the same amount of time.

20. The article of manufacture as claimed in claim 17, wherein the network is the world wide web.

21. The article of manufacture as claimed in claim 17, wherein the set of data is a news release.

22. The article of manufacture as claimed in claim 17, wherein the confirmation receipt is an encrypted status message.

23. The article of manufacture as claimed in claim 17, wherein the key is a set of decryption code.

24. The article of manufacture as claimed in claim 17, wherein the plurality of receivers include a display for viewing the set of data.

25. A system comprising a computer readable medium bearing program code embodied therein for use with a computer, the computer program code including:

a. a local mainframe;

b. a network, wherein the network is coupled with the local mainframe;

c. a plurality of receivers coupled with the network, the plurality of receivers configured to receive a encrypted set of data from the local mainframe; and d. a terminal coupled to each of the plurality of receivers such that a decrypted set of data is displayed on the terminal, wherein a key configured to convert the encrypted set of data to the decrypted set of data is delivered after verification that each of the plurality of receivers confirms receipt of the encrypted set of data and waiting a predetermined delay to receive a confirmation receipt from each of the plurality of receivers and, the verification including receiving a confirmation receipt from each of the plurality of receivers, wherein the key is simultaneously received by each of the plurality of receivers, wherein the network is configured for troubleshooting, in the event that the confirmation receipt is not received from one of the plurality of receivers, and further wherein the network is configured for redistributing the encrypted set of data when one of the plurality of receivers did not receive the encrypted set of data, wherein the encrypted set of data is redistributed to those receivers that did not receive the encrypted set of data.

26. The system as claimed in claim 25 wherein the local mainframe is configured in a three tier architecture including an application server, a front server and a database.

27. The system as claimed in claim 26 wherein the application server is configured to receive a client submission from an order entry application and further configured to access the database.

28. The system as claimed in claim 27 wherein the decrypted set of data is substantially similar to the client submission.

29. The system as claimed in claim 28 wherein the client submission is processed by the order entry application.

30. The system as claimed in claim 26 wherein the front server is coupled to the application server and is further coupled to the network so as to effectuate distribution of the encrypted set of data to the plurality of receivers.

31. The system as claimed in claim 25 wherein the network is a local area network.

32. The system as claimed in claim 25 wherein the network is a wide area network.

33. The system as claimed in claim 25 wherein the network is the internet.

34. The system as claimed in claim 25 wherein each of the plurality of receivers includes a decryption database configured such that the decryption database effectuates the key converting the encrypted set of data to the decrypted set of data.

35. An apparatus for providing simultaneous information delivery over a network comprising:

a. a storage media for storing a computer application;

b. a processing unit coupled to the storage media; and c. a user interface coupled to the processing unit such that a plurality of users can receive an encrypted set of data and have the encrypted set of data decrypted with a simultaneously delivered key, wherein the simultaneously delivered key is delivered after verification that each of the plurality of users confirms receipt of the encrypted set of data and waiting a predetermined delay to receive a confirmation receipt from each of the plurality of users, the verification including receiving the confirmation receipt from each of the plurality of users, wherein the network is configured for troubleshooting, in the event that the confirmation receipt is not received from one of the plurality of users, and further wherein the network is also configured for redistributing the encrypted set of data when one of the plurality of users did not receive the encrypted set of data, wherein the encrypted set of data is redistributed to those users that did not receive the encrypted set of data.

* * * * *

UNITED STATES PATENT AND TRADEMARK OFFICE
CERTIFICATE OF CORRECTION

| | | |
|---|---|---|
| PATENT NO. | : 7,069,245 B2 | Page 1 of 1 |
| APPLICATION NO. | : 10/359992 | |
| DATED | : June 27, 2006 | |
| INVENTOR(S) | : Steve Messick et al. | |

It is certified that error appears in the above-identified patent and that said Letters Patent is hereby corrected as shown below:

Title page, item (73) Assignee:

Replace Assignee with; --Business Wire, a Corporation, San Francisco, CA (US)--

Signed and Sealed this

Seventeenth Day of June, 2008

JON W. DUDAS
*Director of the United States Patent and Trademark Office*